Oct. 27, 1959  E. E. KREITSEK ET AL  2,910,647

ELAPSED TIME INDICATORS

Filed May 31, 1957

INVENTORS
EDWARD E. KREITSEK
VERNON O. BARTELS

By
ATTORNEY

United States Patent Office 2,910,647
Patented Oct. 27, 1959

2,910,647
ELAPSED TIME INDICATORS

Edward E. Kreitsek, South Sudbury, and Vernon O. Bartels, Waltham, Mass., assignors to Raytheon Company, a corporation of Delaware Application May 31, 1957, Serial No. 662,924

1 Claim. (Cl. 324—68)

This invention relates to elapsed time indicators for indicating the length of time a constant current has passed through an electrolyte.

In electrical equipment it is frequently important to distinguish for how long current has passed through a given component or circuit. This has been done by means of various electromechanical devices that are bulky and expensive. What is desired is a cheap, compact elapsed-time indicator that can be read easily and is not appreciably affected by changes in ambient temperature and which will operate equally well in any attitude.

The present invention makes use of the changes caused by the passage of a current between two electrodes in an electrolyte. These changes are the change in weight or dimensions of the electrodes due to the transfer of material from one electrode to the other, the change in resistance between the electrodes due to the passage of current between them and through the electrolyte, and the change in color of the electrolyte due to the chemical changes caused by the passage of current through it between the electrodes.

The change of resistance and the change in color of the electrolyte may most conveniently be measured by the use of an electrolyte made of a metallic salt dissolved in water and contained in an insulating envelope, preferably transparent, into which a pair of electrodes are introduced. The device for utilizing the change in weight of an electrode is most convenient if one electrode is readily removable from the envelope so that it can be weighed as by forming this electrode on a cap that can be screwed onto the envelope.

The foregoing and other advantages of this invention will be better understood from the following description taken in conjunction with the accompanying drawings wherein.

Figure 1:
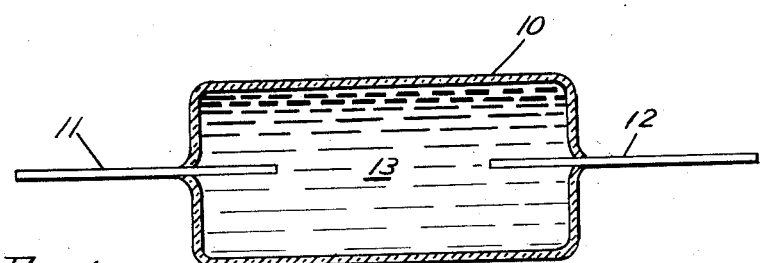
Fig. 1 is a longitudinal section of one embodiment of the invention.

In Fig. 1, the reference numeral 10 designates an envelope of insulating material, preferably transparent, such as glass. A pair of electrodes 11 and 12 are inserted into the envelope one at each end. The envelope is filled with an electrolyte 13, such as an aqueous solution of a metallic salt, such as copper sulphate. When a voltage is applied between the electrodes 11 and 12, the electrolyte disassociates into positive and negative ions with the positively-charged ions, or cations, going towards the negative electrode. In the case of copper sulphate, the cations are copper which is deposited upon the negative terminal. By Faraday's law the weight of copper deposited on the negative electrode in a given time will be proportional to the electric current that is passed through the electrolyte in that interval of time. Thus the change in weight of the negative electrode in a given time is a measure of the current that has passed through the electrolyte. Conversely, if the average current flowing through the electrolyte in this time interval is known, the difference in weight is a measure of the total time this current has flowed through the device even if the flow was intermittent. The change in the amount of copper deposited can also be measured as a change in length of the negative electrode.

As the current flows through the electrolyte as charges on the ions, the resistance of the electrolyte is determined by the concentration of the ions in it. This concentration is reduced as more and more current flows through the electrolyte. This means that the resistance of the device increases as more and more current flows through it so that with constant average current flowing when the device is conducting, the increase of its resistance is a measure of the time the current has passed through it.

Many of the ion-producing solids in such electrolytes give a color to the electrolyte which varies in intensity with the concentration of the solute in the solution of the electrolyte. Thus this color change is the measure of the time a constant current has passed through the device. When this change in color is used to measure the time current has passed through the device, the envelope 10 must be transparent and colorless.

Figure 2:
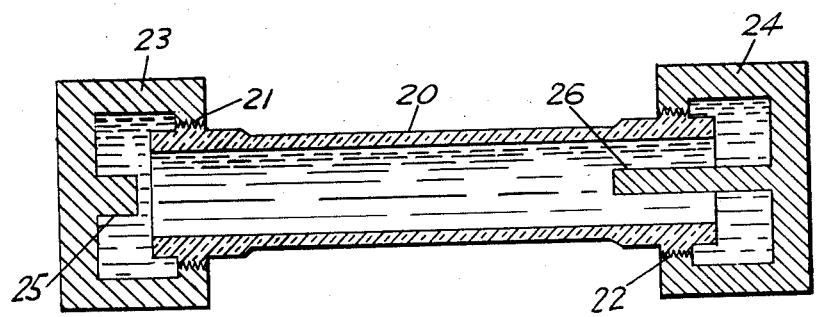
Fig. 2 is a longitudinal section of another embodiment of the invention.

When the change in weight of an electrode is used as a measure, the electrode to be weighed must be so mounted as to be readily removed and reinserted into the envelope. Fig. 2 shows a device utilizing the principles of the invention in which the electrodes can be readily removed from the envelope. Envelope 20 is formed as a tube of insulating material, preferably transparent, although not necessarily so. One material which may be used is polyethylene. The ends 21 and 22 are threaded to receive threaded conductive end caps 23 and 24 formed with rod extensions 25 and 26, respectively, which form the electrodes proper. It will be noted that the end caps 23 and 24 can be readily formed to fit into the well-known types of fuse clips.

In use, the end cap 24 that is to form the cathode is preferably formed with the longer rod projection 26, shown on the right in Fig. 2. Prior to the passage of current through the device, this electrode is unscrewed and removed from tube 20. The electrolyte is introduced into the tube 20 and the end cap 24 after weighing is screwed back onto the tube and the device inserted into the circuit. When the elapsed time is to be measured, the device is removed from the clips and the cathode cap 24 removed and reweighed. The difference in weight is a measure of the amount of current that has flowed through the device and if this current is constant, a measure of the time this current has flowed through the device and any circuit or apparatus connected in series with the device.

The device of Fig. 2 may also be used to measure the elapsed time of current flow by means of the change in its resistance, or when the tube 20 is made transparent and colorless the elapsed time of current flow may be measured by measuring the change in color of the electrolyte by any convenient means, preferably by means of a spectrometer.

Such devices can be readily made of the size of a small-fuse, subminiature vacuum tube or neon light. These devices need not be mounted and maintained in any particular attitude so long as the electrolyte completely fills the envelope. By the use of a sealed envelope, the effect of ambient temperature and humidity and other conditions are minimized. By the use of a construction similar to that shown in Fig. 2, the change in weight indication can be used without destroying the device. If it is known that, when the device or portion of a circuit in series with a device conducts, it will conduct a definite current for a definite time each time, the device with appropriate calibration, will indicate the number of times this conduction has taken place since the device was last examined.

This invention is not limited to the particular details of construction, materials and processes described, as many equivalents will suggest themselves to those skilled in the art. It is accordingly desired that the appended claim be given a broad interpretation commensurate with the scope of the invention within the art.

What is claimed is:

An electrical current measuring device for providing an indication of the magnitude of current flow integrated with respect to time, comprising a tubular member of substantially transparent electrically insulating material including a pair of externally threaded annular collars formed integral therewith and adjacent the ends thereof, a pair of end caps adapted for easy removal from said tubular member cooperatively received on said threaded collars to form with said member a hermetically sealed housing, and an electrolytic liquid substantially filling said housing, each of said end caps being formed of an electrically conducting material and comprising a tubular body, one end thereof being internally threaded and the other end thereof being closed by a transverse wall portion having an internal longitudinal elongate electrode formed integral therewith, each of said electrodes extending in a direction substantially longitudinal of said tubular member when said end caps are threaded in place, with at least one of said electrodes thereof extending into said tubular member a significant distance, to provide an indication in gross of an integrated current flow by visual observation through the wall of said tubular member of changes in the dimensions of such of said electrodes as extend into said tubular member, and an indication in fine by measuring changes in the mass of at least one of said end caps upon removal of same from said tubular member.

References Cited in the file of this patent
UNITED STATES PATENTS

| | | |
|---|---|---|
| Re. 24,190 | Kroko | July 31, 1956 |
| 411,042 | Koole | Sept. 17, 1889 |
| 476,990 | Edison | June 14, 1892 |
| 1,059,002 | Ruprecht | Apr. 15, 1913 |
| 1,860,397 | Slawinski | May 31, 1932 |
| 2,714,189 | Ballard | July 26, 1955 |